UNITED STATES PATENT OFFICE.

CHESTER NEWTON MYERS, OF VALLEY FALLS, NEW YORK, ASSIGNOR TO HERMAN A. METZ, OF NEW YORK, N. Y.

COMPLEX ARSENO-STIBINO COMPOUNDS AND PROCESS OF MAKING THE SAME.

1,422,294.      Specification of Letters Patent.      Patented July 11, 1922.

No Drawing.      Application filed April 21, 1921. Serial No. 463,327.

*To all whom it may concern:*

Be it known that I, CHESTER NEWTON MYERS, a citizen of the United States, residing at Valley Falls, in the county of Rensselaer and State of New York, have invented certain new and useful Improvements in Complex Arseno-Stibino Compounds and Processes of Making the Same, of which the following is a specification.

I have found that arseno-stibino compounds or derivatives possessing very valuable therapeutic properties for the treatment of infectious diseases of the protozoal type are obtained by combining in solution compounds containing certain atomic complexes of arsenic and antimony.

These arseno-stibino compounds are produced by the action of reducing reagents upon aromatic acids or the alkali metal salts of aromatic acids of arsenic and antimony having the general formulæ given below.

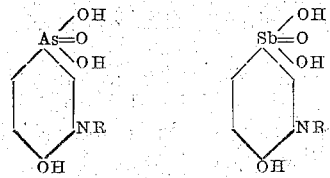

In the above formulæ the letter R designates oxygen, hydrogen or a radical such as alkyl, acyl, sulfoxylate or other aliphatic groupings, such as are ordinarily substituted in amino groups.

The aromatic arsinic and stibinic acids represented by the above general formulæ are acted upon by nitrating reagents, oxidizing reagents, and reducing reagents, yielding to the reducing action of either tin, stannous chlorid, or zinc dust in the presence of strong acid solutions, hypophosphorous acids, phosphorous acid, sulfur dioxid in the presence of potassium iodid, and particularly to the reducing action of a substance of the nature of commercial sodium hydrosulfite.

In order that the invention may be clearly understood the following specific examples are given by way of illustration. My invention is, however, not limited to the specific procedure and chemical reagents described.

Equimolecular quantities of sodium salts of the aromatic arsinic and stibinic acids, such as may be combined to form the arseno-stibino derivatives are prepared as follows:

*I. Preparation of the sodium salt of the arsinic acid.*—Dissolve 12.8 grams of 3 nitro 4 hydroxy phenyl arsinic acid in 300 cc. of water at 45° C. and add 8.5 cc. of 40% NaOH solution. The resulting solution is clear and free from undissolved material.

*II. Preparation of the sodium salt of the stibinic acid.*—Dissolve 15 grams of 3 nitro 4 hydroxy phenyl stibinic acid in 300 cc. of water at 45° C. and add 8.5 cc. of 40% NaOH solution. The resulting solution is clear and free of undissolved particles.

The arseno-stibino derivative may be prepared by either of the following methods.

*III. Preparation of the arseno-stibino derivative.*—Dissolve 300 grams of commercial sodium hydrosulfite in 1,700 cc. of water at 3° C. and when the salt is completely dissolved add the equimolecular proportions of the sodium salts of the arsinic and stibinic acids, prepared according to Examples I and II, with continuous stirring. Heat the mixture on a water bath at the rate of one degree a minute until a maximum temperature of 68° C. is reached and maintain this temperature for about one hour and thirty minutes, allowing the separation of the complex arseno-stibino base to take place. Filter the base from the mixture rapidly, protecting the precipitate by a neutral gas and wash the base until the wash water gives a neutral reaction with litmus and then replace the remaining water by methyl alcohol.

*IV. Preparation of the arseno-stibino derivative.*—Dissolve 450 grams of commercial sodium hydrosulfite and 67 grams of magnesium chlorid in 1,700 cc. of water at 3° C. and to this solution add the equimolecular proportions of the sodium salts of the arsinic and stibinic acids prepared according to Examples I and II and proceed in the same manner as described in Example III.

The general formula for the arseno-stibino compound may be represented as follows:

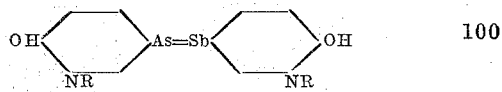

in which the letter R designates hydrogen or a radical, such as alkyl, acyl or sulfoxylate or other aliphatic groupings such as are ordinarily substituted in ring compounds.

The arseno-stibino derivative or base prepared as described in examples III and IV is insoluble in ordinary organic solvents and for this reason it is desirable to convert it into a more soluble compound. The dihydrochlorid has been found to be a suitable and satisfactory salt for commercial and therapeutic uses and is prepared as follows:

V. *Preparation of the dihydrochlorid of the arseno-stibino base.*—Suspend the arseno-stibino base prepared according to either Example III or Example IV in methyl alcohol and add to the suspension 3.7 grams of hydrochloric acid, preferably in the form of 12 cc. of a 29% methyl alcohol solution of hydrochloric acid. Filter the resulting dark brown solution rapidly and then precipitate the dihydrochlorid by running the solution into anhydrous ether or concentrated hydrochloric acid.

The dihydrochlorid is a brownish-yellow amorphous powder readily soluble in cold water and forms sodium salts in which the sodium replaces the hydrogen of the hydroxyl groups found in the para position with respect to the arsenic and antimony. The dihydrochlorid has distinctly acid properties when dissolved in water and possesses the properties of an amino compound in that the hydrogen of the amino group is readily replaced by other radicals, such as those represented by the letter R in the above formulæ, leading to a series of complex compounds.

The dihydrochlorid may be represented by the following formula.

VI. *Preparation of the sulfoxylic acid compound of the arseno-stibino base.*—Dissolve 1.9 grams of the arseno-stibino dihydrochlorid in 6 cc. of methyl alcohol containing water and add 2 cc. of 37½% sodium sulfoxylate. The resulting solution contains the corresponding sulfoxylic acid compound of the arseno-stibino base. To this solution add sodium carbonate solution to exact neutrality. Filter and pour the resulting solution into 400 cc. of a mixture of equal parts of anhydrous alcohol and ether. The so precipitated product is filtered and dried in vacuum and sealed in vacuum ampules. The product is soluble in water with a slightly alkaline reaction.

The sodium sulfoxylate compound may be represented by the following formula.

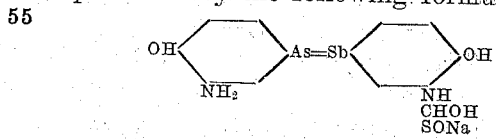

The sulfoxylate group may be attached to the second amino group as indicated in the above formula or it may be attached to the first amino group.

The arseno-stibino preparation has been tested upon animals infected with protozoal diseases and has been found to be of chemical, biological, and therapeutic importance. The preparation is therapeutically more efficacious than arseno compounds which are known and the ratio of the curative dose to the tolerated dose is more favorable as shown by its action upon trypanosomes.

I claim:

1. Process of making arseno-stibino compounds which comprises subjecting a solution containing an aromatic arsinic acid having the general formula

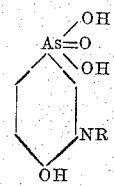

in which R designates oxygen, hydrogen, or an alkyl, acyl, sulfoxylate, or other aliphatic grouping, and an aromatic stibinic acid having the general formula

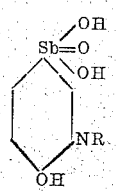

in which R designates oxygen, hydrogen, or an alkyl, acyl, sulfoxylate, or other aliphatic grouping to the action of a reducing reagent.

2. Process of making arseno-stibino compounds as defined in claim 1 in which the reducing reagent is commercial sodium hydrosulfite.

3. Process of making arseno-stibino compounds as defined in claim 1 in which the aromatic arsinic and stibinic acids are in equi-molecular proportions.

4. Process of making arseno-stibino compounds as defined in claim 3 in which the aromatic arsinic and stibinic acids are in the form of their sodium salts.

5. Process of making arseno-stibino compounds as defined in claim 2 in which the aromatic arsinic and stibinic acids are in the form of their sodium salts and in equi-molecular proportion.

6. Process of making arseno-stibino compounds as defined in claim 1 in which the aromatic arsinic and stibinic acids are reduced by commercial sodium hydrosulfite in the presence of magnesium chlorid.

7. Process of making the dihydrochlorid of arseno-stibino compounds having the formula

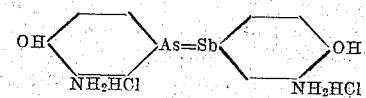

which comprises making arseno-stibino compounds as defined in claim 5, separating the arseno-stibino base from the reaction mixture, suspending said base in alcohol, adding an alcoholic solution of hydrochloric acid to the suspension, and precipitating the dihydrochlorid by pouring the resulting solution into ether.

8. Process of making arseno-stibino compounds as defined in claim 1 in which the letter R designates hydrogen.

9. Process of making arseno-stibino compounds as defined in claim 5 in which the letter R designates hydrogen, and in which the aromatic arsinic and stibinic acids are dissolved in water at 3° C., sodium hydrosulfite is added to the solution, and the temperature of the reaction mixture is increased to 68° C. at the rate of one degree a minute and maintained at 68° C. for one hour and thirty minutes.

10. Process of making arseno-stibino compounds as defined in claim 7 comprising separating the dihydrochlorid from the reaction mixture, dissolving the said dihydrochlorid in alcohol, adding sodium sulfoxylate to the alcoholic solution, neutralizing the resulting solution with sodium carbonate solution, pouring the resulting neutral solution into a mixture of alcohol and ether, separating the resulting precipitate, and drying and packing said precipitate in vacuum.

11. Arseno-stibino compounds having the general formula

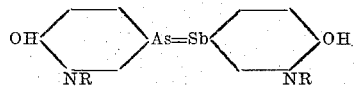

in which R designates hydrogen or alkyl, acyl, sulfoxylate or other aliphatic grouping capable of substitution in an amino group.

12. Arseno-stibino compounds comprising a brownish yellow amorphous powder readily soluble in cold water and having the formula

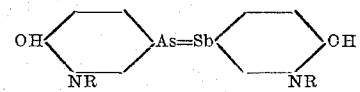

the alkalinized solutions of said compounds being suitable for intravenous injection.

In testimony whereof, I affix my signature.

CHESTER NEWTON MYERS.